United States Patent
Moribe et al.

(10) Patent No.: US 8,393,726 B2
(45) Date of Patent: Mar. 12, 2013

(54) SET OF REACTION LIQUID AND INK, AND IMAGE FORMING METHOD

(75) Inventors: Kenji Moribe, Fujisawa (JP); Mikio Sanada, Kawasaki (JP); Yasuhito Mori, Kawasaki (JP); Junichi Sakai, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 239 days.

(21) Appl. No.: 12/950,623

(22) Filed: Nov. 19, 2010

(65) Prior Publication Data

US 2011/0141190 A1   Jun. 16, 2011

(30) Foreign Application Priority Data

Dec. 11, 2009   (JP) ................. 2009-282060

(51) Int. Cl.
*C09D 11/00* (2006.01)
(52) U.S. Cl. ........... 347/100; 347/95; 347/96; 106/31.6; 106/31.65
(58) Field of Classification Search .............. 347/7, 21, 347/95–100; 106/31.6, 31.65, 31.85; 523/160, 523/161
See application file for complete search history.

(56) References Cited

U.S. PATENT DOCUMENTS

| | | | |
|---|---|---|---|
| 5,451,251 A | 9/1995 | Mafune et al. | |
| 5,571,313 A | 11/1996 | Mafune et al. | |
| 5,911,815 A | 6/1999 | Yamamoto et al. | |
| 6,027,210 A | 2/2000 | Kurabayashi et al. | |
| 6,062,674 A | 5/2000 | Inui et al. | |
| 6,174,354 B1 | 1/2001 | Takizawa et al. | |
| 6,221,141 B1 | 4/2001 | Takada et al. | |
| 6,280,513 B1 | 8/2001 | Osumi et al. | |
| 6,332,919 B2 | 12/2001 | Osumi et al. | |
| 6,375,317 B1 | 4/2002 | Osumi et al. | |
| 6,425,662 B1 | 7/2002 | Teraoka et al. | |
| 6,511,534 B1 | 1/2003 | Mishina et al. | |
| 6,706,105 B2 | 3/2004 | Takada et al. | |
| 7,005,461 B2 | 2/2006 | Sanada et al. | |
| 7,008,977 B2 | 3/2006 | Sakai et al. | |
| 7,160,376 B2 | 1/2007 | Watanabe et al. | |
| 7,276,110 B2 | 10/2007 | Tsujimura et al. | |
| 7,276,112 B2 | 10/2007 | Tokuda et al. | |
| 7,291,211 B2 | 11/2007 | Kaneko et al. | |
| 7,297,202 B2 | 11/2007 | Ichinose et al. | |
| 7,347,890 B2 | 3/2008 | Nito et al. | |
| 7,371,274 B2 | 5/2008 | Sanada et al. | |
| 7,377,631 B2 | 5/2008 | Takata et al. | |
| 7,402,200 B2 | 7/2008 | Imai et al. | |
| 7,605,192 B2 | 10/2009 | Sanada et al. | |
| 7,635,182 B2 | 12/2009 | Hakamada et al. | |
| 7,682,433 B2 | 3/2010 | Yanagimachi et al. | |
| 7,695,099 B2 | 4/2010 | Sanada et al. | |
| 7,699,924 B2 | 4/2010 | Mafune et al. | |
| 7,753,515 B2 | 7/2010 | Tokuda et al. | |
| 7,846,247 B2 | 12/2010 | Mizutani et al. | |
| 7,862,653 B2 | 1/2011 | Sanada et al. | |
| 7,868,060 B2 | 1/2011 | Sakai et al. | |
| 7,878,643 B2 | 2/2011 | Kudo et al. | |
| 2006/0197814 A1 | 9/2006 | Doi | |
| 2006/0203055 A1 | 9/2006 | Doi | |
| 2006/0293410 A1 | 12/2006 | Tokita et al. | |
| 2007/0097155 A1 | 5/2007 | Imai et al. | |
| 2007/0112095 A1 | 5/2007 | Moribe et al. | |
| 2007/0197685 A1* | 8/2007 | Aruga et al. | 523/160 |
| 2008/0106581 A1 | 5/2008 | Sanada et al. | |
| 2008/0280043 A1 | 11/2008 | Moribe et al. | |
| 2008/0280044 A1 | 11/2008 | Okamura et al. | |
| 2009/0079784 A1* | 3/2009 | Chiwata et al. | 347/21 |
| 2009/0163646 A1* | 6/2009 | Kato et al. | 524/560 |
| 2010/0010157 A1 | 1/2010 | Udagawa et al. | |
| 2010/0075046 A1 | 3/2010 | Hakamada et al. | |

FOREIGN PATENT DOCUMENTS

| | | |
|---|---|---|
| JP | 2000-263921 A | 9/2000 |
| JP | 2001-138629 A | 5/2001 |
| JP | 2004-277449 A | 10/2004 |
| JP | 2004-306403 A | 11/2004 |
| JP | 2007-084607 A | 4/2007 |
| WO | 2009/091079 A1 | 7/2009 |

OTHER PUBLICATIONS

Communication dated Mar. 22, 2011, forwarding a European Search Report dated Mar. 11, 2011, in counterpart European Application No. 10014922.8-2102.

* cited by examiner

*Primary Examiner* — Matthew Luu
*Assistant Examiner* — Rut Patel
(74) *Attorney, Agent, or Firm* — Fitzpatrick, Cella, Harper & Scinto

(57) ABSTRACT

Provided is a set of a reaction liquid that has a buffering action against pH change and exhibits a pH of 3.5 or more and 5.5 or less, and an ink that has a higher pH than the reaction liquid. The ink comprises a pigment to a surface of a pigment particle of which a basic group that forms a cation form at the pH of the reaction liquid is bonded. The pigment does not have an acidic group having a pKa equal to or less than the pH of the reaction liquid. The pigment is dispersed by a water-soluble polymer that has an acidic group having a pKa equal to or more than the pH of the reaction liquid and equal to or less than the pH of the ink.

7 Claims, No Drawings

SET OF REACTION LIQUID AND INK, AND IMAGE FORMING METHOD

BACKGROUND OF THE INVENTION

1. Field of the Invention

The present invention relates to a set of a reaction liquid and an ink, and an image forming method.

2. Description of the Related Art

In the past, for the purpose of improving image performance, there has been various proposals for image forming methods that form an image by preparing, in addition to an ink containing a coloring material, a so-called reaction liquid and, for example, applying the reaction liquid onto a recording medium prior to applying the ink.

For example, Japanese Patent Application Laid-Open No. 2001-138629 proposes an image forming method in which recording is performed by causing a reaction liquid including a reaction agent that produces an aggregate when the agent comes into contact with a pigment ink, and an ink including a polymer emulsion particle having a minimum film forming temperature of 20° C. or less, to adhere to a recording medium. Further, Japanese Patent Application Laid-Open No. 2001-138629 states that examples of the reaction agent include polyvalent metal salts and a polyallylamine or a polyallylamine derivative. Japanese Patent Application Laid-Open No. 2000-263921 proposes an ink jet recording method in which recording is performed by causing an ink and a reaction liquid including a cationic water-soluble polymer to adhere to a recording medium. In addition, Japanese Patent Application Laid-Open No. 2007-84607 proposes an ink jet ink set formed from a pigment ink that contains an anionic polymer dispersant and an acidic transparent processing liquid that does not include a coloring material and that has a pH of 3.5 to 5.0. This acidic transparent processing liquid includes a pH buffering agent, which has one carboxyl group with a pKa of 3.7 to 6.5, 10 mass % or more of which is dissolved in water, and which has the property of substantially not volatilizing at 20° C. and ordinary pressure.

To provide a formed image with water resistance, scratch resistance, and highlighter resistance, typically, a water-soluble polymer is blended in the ink. Alternatively, another common method is to incorporate a water-soluble polymer in the ink by using a so-called polymer-dispersed pigment in which a water-insoluble coloring material, such as a pigment, is stabilized with a water-soluble polymer. For example, Japanese Patent Application Laid-Open No. 2004-306403 proposes an ink set that uses an ink in which a water-soluble polymer is directly bonded, or bonded via another atom group, to a pigment.

However, if a water-soluble polymer is incorporated in the ink as in the related art, for example, when plain paper and the like is used as the recording medium, although water resistance, scratch resistance, and highlighter resistance can be conferred to the image, another problem arises, in which the optical density of the image deteriorates. Therefore, the present inventors recognized that it is important to develop a reaction liquid that can be used to obtain an image having a high optical density even when various water-soluble polymers are incorporated in the ink.

Accordingly, it is an object of the present invention to provide a set of a reaction liquid and an ink that can obtain an image having high optical density while conferring water resistance, scratch resistance, and highlighter resistance to the image. Further, it is another object of the present invention to provide an image forming method which uses a set of a reaction liquid and an ink that can obtain an image having the above-described excellent properties.

SUMMARY OF THE INVENTION

The above-described objects are achieved by the following present invention. Specifically, the present invention provides a set of a reaction liquid that has a buffering action against pH change and exhibits a pH of 3.5 or more and 5.5 or less, and an ink that has a higher pH than the reaction liquid, wherein the ink includes a pigment to a surface of a pigment particle of which a basic group that forms a cation form at the pH of the reaction liquid is bonded, and wherein the pigment does not have an acidic group having a pKa equal to or less than the pH of the reaction liquid, and wherein the pigment is dispersed by a water-soluble polymer that has an acidic group having a pKa equal to or more than the pH of the reaction liquid and equal to or less than the pH of the ink.

According to the present invention, a set of a reaction liquid and an ink is provided that can obtain an image having water resistance, scratch resistance, and highlighter resistance, and which has high optical density, in which the problem of deterioration in optical density resulting from having water resistance, scratch resistance, and highlighter resistance in the related art is solved. Further, according to the present invention, an image forming method can be provided which uses a set of a reaction liquid and an ink that can obtain an image having the above-described excellent properties.

Further features of the present invention will become apparent from the following description of exemplary embodiments.

DESCRIPTION OF THE EMBODIMENTS

Preferred embodiments of the present invention will now be described in detail.

The present invention will now be described in more detail with reference to embodiments for carrying out the invention. The various physical properties in the present invention, such as viscosity, surface tension, pH, and pKa, are values at 25° C. Further, in the present invention, the feature that the reaction liquid has a "buffering action against pH change" means, specifically, that the pH of a mixture formed by mixing equal amounts of the reaction liquid and the ink to be used in a set therewith does not substantially change from the pH of the reaction liquid. More specifically, this expression means that the difference between the pH of the reaction liquid and the pH of a mixture formed by mixing equal amounts of the ink and the reaction liquid is within 0.1. In addition, the term "pKa" stipulated in the present invention is an index for quantitatively indicating the strength of an acid, and is also referred to as "acid dissociation constant" or "acidity constant". Considering the dissociation reaction in which hydrogen ions are released from an acid, pKa is expressed with the negative common logarithm. The smaller the pKa, the stronger the acid.

To resolve the problems in the related art, the present inventors carried out investigations to discover the constitution of a reaction liquid that could be used to obtain an image having a high optical density, even when used with an ink that includes various water-soluble polymers. Consequently, first, the present inventors discovered that to obtain an image having a higher optical density without causing acid corrosion of the parts constituting a recording apparatus, it is best to use a reaction liquid which exhibits a pH of 3.5 or more and 5.5 or less, and which has a buffering action against pH change.

Next, the present inventors carried out investigations concerning various water-soluble polymers and various coloring materials in order to discover, when using a reaction liquid which exhibits a pH of 3.5 or more and 5.5 or less, and which has a buffering action against pH change, a preferable water-soluble polymer and coloring material as constituent components of the ink to be combined with such a reaction liquid. Consequently, the present inventors found that, depending on the type of water-soluble polymers and coloring materials, the relationship between water resistance, scratch resistance, and highlighter resistance of an image and the optical density of the image, among which conventionally there has been a tradeoff, can be satisfied. On the other hand, the present inventors found that the optical density of the obtained image greatly differs depending on the type of water-soluble polymers and the type of coloring materials. Thus, the present inventors carried out even more detailed investigations concerning the conditions required to obtain an image having a high optical density.

Therefore, the optical density of an obtained image depends on how effectively the coloring material is kept near the surface of the recording medium. In other words, to increase the optical density, a large amount of coloring materials should be kept near the surface of the recording medium. To achieve such a state, rather than using a water-soluble coloring material such as a dye, it is effective to use a pigment, which is a water-insoluble coloring material. Therefore, in the present invention, a pigment is used.

Further, to keep a larger amount of pigment near the surface of the recording medium, it is preferable to design so that the pigment, which is in a dispersed state in the ink, quickly changes into as large aggregates as possible by coming into contact with the reaction liquid on the recording medium. To achieve this, it is necessary to reduce the pH of the ink with the reaction liquid, which acts as a trigger to destabilize the dispersed state of the pigment. In addition, it is necessary to allow the pigment particles whose dispersed state has thus been destabilized, to repeatedly collide with each other and grow into a large agglomerate. Therefore, to more effectively destabilize the dispersed state of the pigment by contacting the reaction liquid with the ink, the repulsion due to the steric hindrance and the electric charge of the pigment during a dispersed state need to be eliminated as much as possible by reducing the pH of the ink. For that purpose, it is preferable to take control so that the functional groups that contribute to the dispersion of the pigment are in a dissociated form, that is, an anion form, in the state of ink, and are in a free form, that is, a nonion form, in the pH-reduced state. The preferable dispersed state of the pigment will now be considered.

First, the dispersed state of the pigment can be broadly divided into two forms. One is a form that is called a self-dispersing pigment, in which a hydrophilic group is bonded to the surface of a pigment particle and thereby the pigment is dispersed due to the hydrophilicity of this group. The other is a form called a polymer-dispersed pigment, in which a water-soluble polymer having a hydrophilic group is physically adhered by hydrophobic interaction or chemically bonded to the surface of a pigment particle and thereby the pigment is dispersed due to the water solubility of the polymer. To take control so that as described above the ionic nature of the functional groups contributing to the dispersion of the pigment is changed for the pigment to grow into a large aggregate by destabilizing the dispersed state of the pigment, it is more preferable to use a polymer-dispersed pigment.

The reason for this is because, for a self-dispersing pigment, the pigment used as a raw material may have hydrophilic groups contributing to dispersion present on the surface of the pigment particle other than the hydrophilic group bonded to the particle surface for the purpose of dispersing the pigment. Specifically, for such a self-dispersing pigment, since it is required to optimally control the ionic nature of the various functional groups present on the surface of the pigment particle that contribute to dispersion in both an ink state and a pH-reduced state, control becomes more difficult. In contrast, for a polymer-dispersed pigment, since the surface of the pigment particle is covered by the polymer dispersant, the chances for the hydrophilic group of the pigment used as a raw material to be exposed to the surface of the pigment particle are very small. Therefore, the functional groups of the pigment dispersed by the polymer that contribute to dispersion are essentially restricted to the functional groups that the polymer dispersant has. This makes it easier to carry out the optimum ionic nature control for both the ink state and the pH-reduced state. Based on the above-described reasons, it was concluded that, in a reaction system in which the dispersed state of the pigment has been destabilized by reducing the pH of the ink with the reaction liquid, it is more preferable to use a polymer-dispersed pigment than a self-dispersing pigment.

Next, based on the constitution of the present invention, the mechanism with which the advantageous effects of the present invention are obtained will be described. For the set according to present invention, it is necessary for the pigment included in the ink to have a basic group that forms a cation form at the pH of the reaction liquid and is bonded to the surface of the pigment particle (hereinafter, sometimes referred to as "basic group bonded to the surface of the pigment particle"). In addition, the pigment needs to be dispersed with a water-soluble polymer having no acidic group with a pKa that is equal to or less than the pH of the reaction liquid and having an acidic group with a pKa that is equal to or more than the pH of the reaction liquid and equal to or less than the pH of the ink (hereinafter, sometimes referred to as "polymer acidic group"). In the following, the pigment bonded with a basic group that forms a cation form at the pH of the reaction liquid may be simply referred to as pigment. Further, the water-soluble polymer, which forms the ink used in the present invention and is used to disperse the pigment, may be simply referred to as a polymer dispersant.

Here, the condition that the pigment is dispersed in the ink by the polymer dispersant (water-soluble polymer) refers to the following state. Specifically, this is a state in which, in the ink, the polymer dispersant is physically adhered or chemically bonded to the surface of a pigment particle and thereby the pigment is stably dispersed in an aqueous medium such as waster due to the water solubility of the polymer. Whether the pigment is dispersed in the ink by the polymer dispersant may be verified in the following manner by, for example, subjecting the ink to centrifugal separation, and recovering from the produced sediment a dispersion product formed from the pigment and substances physically adhered or chemically bonded to the pigment. More specifically, verification can be carried out by determining whether, among the substances other than the pigment in the components recovered by centrifugal separation, the substance with the highest content is a polymer dispersant that matches the above-described conditions.

When the above requirements stipulated for the present invention are satisfied, the state of the pigment dispersed by the polymer dispersant in an ink state after coming into contact with the reaction liquid on the recording medium is as follows. First, in an ink state, the pKa of the polymer acidic group is equal to or less than the pH of the ink. Therefore, the pigment will be in a dissolved state, mainly in a dissociated form, specifically, in an anion form, with a polymer layer formed around the pigment particle. Consequently, the dispersed state of the pigment is stabilized by both the repulsion of the anion electric charge and the repulsion caused by the steric hindrance of the polymer dispersant. Conversely, if the pKa of the polymer acidic group is higher than the pH of the ink, in an ink state the pigment will be mainly in a free form, that is, a nonion form. Consequently, the solubility dramatically deteriorates, and thus the dispersion stability of the ink cannot be maintained, which is not suitable for the present invention.

If the pKb (base dissociation constant) of the basic group bonded to the surface of the pigment particle is equal to or less than the pOH of the ink (=14−ink pH), this basic group can be considered to be in a cation form. However, for the polymer-dispersed pigment used in the present invention, since the pigment forms a state in which it is stably dispersed by the polymer dispersant, the amount of cations of the basic group can be considered as being sufficiently lower than the amount of anions of the polymer acidic group. When such an ink contacts with the reaction liquid on the recording medium, the pH of the resultant mixed system is roughly the same as the pH of the reaction liquid due to the reaction liquid's buffering action against pH change. Consequently, the pKa of the polymer acidic group is equal to or more than the pH of this mixed system. Therefore, the pigment is mainly in a free form, that is, a nonion form, and thus much of the repulsion caused by electric charge is lost. In addition, due to the reduction in the solubility of the polymer dispersant, the polymer dispersant is acid-precipitated near the surface of the pigment particle, and thus the repulsion caused by the steric hindrance of the polymer dispersant also weakens. Due to these state changes, the dispersed state of the pigment is quickly destabilized.

To more effectively maintain the dispersion stability in the ink state and more effectively destabilize after contact with the reaction liquid, it is preferable that all of the hydrophilic groups that the water-soluble polymer (polymer dispersant) has have a pKa that is equal to or more than the pH of the reaction liquid and equal to or less than the pH of the ink. More specifically, for the acidic group, from the perspectives of versatility and polymerizability of the monomer used as a raw material, it is preferable to select a carboxyl group. On the other hand, for the hydrophilic group of the water-soluble polymer (polymer dispersant), if an acidic group that has a pKa which does not satisfy the condition of being equal to or more than the pH of the reaction liquid and equal to or less than the pH of the ink is included, it is more difficult to obtain higher-level optical density.

The ratio of the dissociated form, i.e. the anion form, polymer acidic groups that remain from among the total of polymer acidic groups is determined based on the difference between the pKa of the polymer acidic groups and the pH of the reaction liquid. If an anion form polymer acidic group remains near the surface of the pigment particle, although the dispersed state of the pigment is destabilized, a certain level of electric charge repulsion remains.

Two conventional methods for reducing the number of anion form polymer acidic groups that remain near the surface of the pigment particle will now be described. One method is to widen the difference between the pKa of the polymer acidic groups and the pH of the reaction liquid. Another method is to reduce the number of polymer acidic groups.

In the former method, it is necessary to increase the pKa of the polymer acidic groups, or decrease the pH of the reaction liquid. A method for increasing the pKa of the polymer acidic groups is to use an acidic group having a comparatively high pKa among general-purpose polymer dispersant acidic groups. Examples of such an acidic group include a carboxyl group. However, the pKa of the carboxyl group that the polymer dispersant has is around 5.0 to 5.5, which means that a large difference from the pH of the reaction liquid cannot be obtained. The number of types of acidic groups that are general-purpose and have an even higher pKa is actually quite few. Although a hydroxyl group, which exhibits a nonionic nature (pKa of about 16.0) can be given as such an example, a hydroxyl group is not very suitable for the present invention. This is because if a polymer dispersant is used having only hydroxyl groups as the acidic group, to stably disperse the pigment, a long time period is required for the dispersion treatment, and thus energy efficiency is poor. Further, as a method for lowering the pH of the reaction liquid, for example, if carboxyl groups are used as the polymer acidic group, in order for essentially all, more specifically, 99% or more, of the polymer acidic groups be in a nonion form, the (pKa−pH) value needs to be 2.0 or more. Consequently, the pH of the reaction liquid in this case needs to be about 3.0 to 3.5. This is beyond the precondition of the set according to the present invention of having a reaction liquid pH of 3.5 or more and 5.5 or less. Thus, the former method is not suited to the present invention.

On the other hand, in the latter method, the number of polymer acidic groups can be reduced by lowering the acid value of the polymer dispersant dispersing the pigment in an ink state, or reducing the amount of polymer dispersant with respect to the amount of pigment, and thus the number of remaining anion form polymer acidic groups can be reduced. However, the ratio of remaining anion form polymer acidic groups in the total of polymer acidic groups depends on the pKa of the polymer acidic groups and the pH of the reaction liquid. Therefore, the remaining anion form polymer acidic groups cannot be completely eliminated.

Accordingly, in the present invention, the present inventors have successfully obtained an image having a high optical density that could not be achieved in the prior art, by bonding a specific basic group, specifically, a basic group that forms a cation form at the pH of the reaction liquid, to the surface of a pigment particle. More specifically, the basic group used in the present invention that is bonded to the surface of a pigment particle forms a cation form at the pH of the reaction liquid. Therefore, when the reaction liquid comes into contact with the ink on the recording medium, a state in which a cation derived from this basic group is present on the surface of the pigment particle is produced. Consequently, the electric charge of an anion form polymer acidic group that remains near the surface of the pigment particle can be cancelled by ionic interaction, and thus the dispersed state of the pigment is dramatically destabilized. However, if the pigment on which the basic group is bonded has another acidic group with a pKa equal to or less than the pH of the reaction liquid, after the reaction liquid comes into contact with the ink on the recording medium, a state in which an anion derived from this acidic group is present on the surface of the pigment particle is produced. Since the anion present on the surface of the pigment particle in this case cannot move like the anion present in the polymer dispersant in the mixture of the ink and the reaction liquid, the chances for the anion to come into contact with the cation present on the surface of the pigment particle are very low, which makes it difficult for ionic interaction to be exhibited. Consequently, this contributes to stabilization of the dispersed state of the pigment. Thus, the latter method is not suited to the present invention.

For example, the pigment included in the pigment dispersion 1 described in Japanese Patent Application Laid-Open No. 2004-306403 is dispersed as follows. First, aminophenyl-2-sulfate ethyl-sulfone (APSES) is caused to bond to the surface of carbon black (pigment). Then, pentaethylene hexamine (PEHA) is bonded, followed by bonding a styrene-acrylic acid polymer. Although the resultant pigment could be considered to be suitable because it has an amine derived from the PEHA present on the surface of a pigment particle, and thus can be cationically charged, because a sulfonic acid group derived from the APSES is also simultaneously present, thus, the pigment contributes to pigment dispersion. Consequently, the advantageous effects of the present invention cannot be obtained with the pigment described in Japanese Patent Application Laid-Open No. 2004-306403.

According to investigations carried out by the present inventors, it is preferable that the anion amount derived from acidic groups remaining near the surface of a pigment particle after the reaction liquid comes into contact with the ink on the recording medium and the cation amount derived from the basic group bonded to the surface of the pigment particle is the same. This is because by setting in this manner the advantageous effects of the present invention can be most effectively obtained. The anion amount described above is calculated by calculating the total amount of acidic groups based on the acid value of the polymer dispersant and the mass ratio of the pigment and the polymer dispersant, then calculating the dissociation ratio of the acidic group that can be estimated based on the difference between the pKa of the polymer acidic group and the pH of the reaction liquid, and multiplying the two calculated values. However, even if the anion amount and the cation amount are not the same, since the electric charge remaining on the surface is significantly reduced compared with the case where a basic group is not bonded, the advantageous effects of the present invention can still be obtained.

The significance of chemically bonding the basic group that forms a cation form at the pH of the reaction liquid to the surface of a pigment particle will now be described. According to investigations carried out by the present inventors, for a system in which a compound having the above-described basic group is added to an ink without bonding the basic group that forms a cation form at the pH of the reaction liquid to the surface of the pigment particle, the high optical density like that achieved by the present invention could not be obtained. More specifically, in such a case, the state of the ink and the state of the basic group after coming into contact with the reaction liquid on the recording medium change in the same manner as in the case where the basic group is bonded to the surface of the pigment particle. However, because the basic group is not bonded to the surface of the pigment particle, the region where the compound having the basic group is present spreads throughout the whole ink. Therefore, the chances of the compound which will form the above-described cation form being present near an anion form polymer acidic group remaining near the surface of the pigment particle are dramatically reduced, and thus the elimination of repulsion caused by the electric charge of the dispersed state pigment is reduced to an extremely low level. Therefore, the reason why the basic group needs to be bonded to the surface of the pigment particle is to effectively cancel both the electric charge of the basic group and the electric charge of the polymer acidic group that are bonded to the surface of the pigment particle after coming into contact with the reaction liquid on the recording medium.

Whether the basic group that forms a cation form at the pH of the reaction liquid is bonded to the surface of the pigment particle can be confirmed in the following manner. First, the ink is subjected to centrifugal separation, and the sediment is recovered. Substances adhered to the surface of the pigment particles in the sediment are washed away by Soxhlet extraction. Then, for example, the functional groups are analyzed by X-ray photoelectron spectroscopy to determine whether the pigment particles have a basic group. In addition, for example, the pKa is determined by potentiometric titration or the like. If the presence of a basic group on the surface of the pigment particle is confirmed and the pKa of the basic group is equal to or more than the pH of the reaction liquid, the basic group that forms a cation form at the pH of the reaction liquid can be supposed to be bonded to the surface of the pigment particle. Alternatively, more simply, this can be confirmed by washing away the substances adhered to the surface of the pigment particle, and then determining whether the pigment is cationically charged by zeta potential measurement.

To improve the water resistance, scratch resistance, and highlighter resistance of an image, another water-soluble polymer may be included in the ink. In such a case, if the water-soluble polymer is a polymer that maintains a dissolved state even after coming into contact with the reaction liquid during image formation, the viscosity of the solution increases, which causes the collision frequency among the dispersed state pigments to decrease. Consequently, the pigment is inhibited from forming large aggregates. For the above reasons, this another water-soluble polymer described above included in the ink needs to be quickly made insoluble after coming into contact with the reaction liquid during image formation. Therefore, similar to the polymer acidic group conditions, it is preferable that the pKa of another water-soluble polymer included in the ink also is equal to or less than the pH of the ink and equal to or more than the pH of the reaction liquid.

<Set of Reaction Liquid and Ink>

The reaction liquid and the ink forming the set according to the present invention will now each be described in more detail.

Reaction Liquid

Each of the components forming the reaction liquid used in the present invention will now be described below. Since the reaction liquid used in the present invention is used with an ink during image formation, it is preferable that the reaction liquid is a colorless reaction liquid that does not include a coloring material, and does not exhibit absorption in the visible spectrum, in consideration of affecting an image. However, even if the reaction liquid exhibits absorption in the visible spectrum, as long as such absorption is at such a level that does not affect an actual image, the reaction liquid may have a pale color that exhibits absorption in the visible spectrum. Further, the reaction between the reaction liquid and the ink in the present invention is caused by bringing the reaction liquid and the ink into contact and thus allowing at least a part of the components forming the ink to undergo acid precipitation due to the pH of the mixed liquid. More specifically, the reaction can be achieved by setting the components in the reaction liquid and the ink and setting the pH so that the components forming the ink are stably dispersed at the pH of the ink, and the dispersed state of the components forming the ink is unstable at the pH of the mixed liquid.

Buffering Action of Reaction Liquid Against pH Change

The reaction liquid forming the set according to the present invention needs to exhibit a pH of 3.5 or more and 5.5 or less, and a buffering action against pH change. As described above, the expression "buffering action against pH change" in the present invention means, specifically, that the pH of a mixture formed by mixing equal amounts of the reaction liquid and the ink used in a set therewith does not essentially change from the pH of the reaction liquid. More specifically, this expression means that the difference between the pH of the reaction liquid and the pH of a mixture formed by mixing equal amounts of the ink and the reaction liquid is within 0.1.

To make the reaction liquid have a buffering action, it is preferable to include a buffering agent like the following. Examples of the buffering agent include a salt of a monocarboxylic acid such as formic acid, acetic acid, propionic acid, and butyric acid; a salt of a dicarboxylic acid or a hydrogen salt of a dicarboxylic acid such as phthalic acid, isophthalic acid, terephthalic acid, oxalic acid, malonic acid, succinic acid, glutaric acid, adipic acid, maleic acid, fumaric acid, itaconic acid, sebacic acid, dimer acid, pyromellitic acid, and trimellitic acid; a salt of a hydroxy carboxylic acid such as malic acid and tartaric acid; and various salts such as phosphates, hydrogen phosphates, carbonates, and bicarbonates. Examples of the cation forming the salt include alkali metal ions of lithium, sodium, potassium and the like. Further examples that can be used in the present invention include any known compound capable of having a buffering action against pH change, as long as such compound is a substance that can maintain the pH of the reaction liquid within the above-described preferable pH range by addition thereof. In the present invention, as the buffering agent, it is preferable to use an acetate, or a salt of a polyvalent carboxylic acid or a hydrogen salt of a polyvalent carboxylic acid, such as citric acid and glutaric acid. The content (mass %) of the buffering agent in the reaction liquid may be arbitrarily set as long as the reaction liquid has the buffering action stipulated in the present invention. For example, the buffering agent content is preferably, based on the total mass of the reaction liquid, 1.0 mass % or more and 15.0 mass % or less. Further, to adjust it so that the reaction liquid has a pH of 3.5 or more and 5.5 or less, for example, it is preferable to include a pH regulator such as an organic acid like acetic acid, and methanesulfonic acid, an inorganic acid like sulfuric acid and nitric acid, or a base like an alkali metal hydroxide.

(Polyvalent Metal Ion)

A polyvalent metal ion may be further incorporated into the reaction liquid forming the set according to the present invention. For such a composition, in addition to the destabilization of the dispersed state of the pigment due to acid precipitation when the reaction liquid comes into contact with the ink on the recording medium, a salt precipitation effect due to the polyvalent metal ion can also be obtained, which enables an image having an even higher optical density to be obtained. Examples of the polyvalent metal ion include polyvalent metal ions such as divalent and trivalent metal ions. To incorporate such a polyvalent metal ion into the reaction liquid, a salt of the polyvalent metal is used. Although the salt is a metal salt formed from a polyvalent metal ion such as that described above and an anion bonding with this ion, the salt needs to be soluble in water. It is preferable that the content (mass %) of the polyvalent metal ion in the reaction liquid is, based on the total mass of the reaction liquid, 1.0 mass % or more and 30.0 mass % or less in terms of content of the polyvalent metal.

Aqueous Medium

It is preferable that the reaction liquid forming the set according to the present invention includes water or a mixed solvent of water and a water-soluble organic solvent as an aqueous medium. As the water, it is preferable to use deionized water or ion-exchanged water. It is preferable that the content (mass %) of the water in the reaction liquid is, based on the total mass of the reaction liquid, 25.0 mass % or more and 95.0 mass % or less. Further, as the water-soluble organic solvent, any known organic solvent generally used in a reaction liquid for an ink jet or for roller coating may be used. Further, one kind or two kinds or more of water-soluble organic solvents may be used. Specific examples thereof include monovalent or polyvalent alcohols, alkylene glycols having an alkylene group with about 1 to 4 carbon atoms, polyethylene glycols having an average molecular weight of about 200 to 2,000, glycol ethers, and nitrogen-containing compounds. It is preferable that the content (mass %) of the water-soluble organic solvent in the reaction liquid is, based on the total mass of the reaction liquid, 3.0 mass % or more and 70.0 mass % or less.

Other Components

In addition to the above-described components, the reaction liquid forming the set according to the present invention may optionally include an organic compound that is a solid at ordinary temperature, such as trimethylol ethane and trimethylol propane, and a nitrogen-containing compound, such as urea and ethylene urea. Further, in addition to the above-described components, the reaction liquid may optionally further include various additives, such as a surfactant, a polymer compound, a defoamer, a corrosion inhibitor, a preservative, an antifungal agent, an antioxidant, anti-reduction agent, an evaporation accelerator, and a chelating agent. Although the content (mass %) of the surfactant depends on factors such as the type of the polymer compound optionally added to the reaction liquid, based on the total mass of the reaction liquid, this content is preferably 0.01 mass % or more and 10.0 mass % or less.

Further, by including a polymer compound such as a polymer in the reaction liquid, the polymer compound functions as a binder of the pigment in the ink, which enables the scratch resistance of the formed image to be improved. The content (mass %) of the polymer compound in the reaction liquid is preferably, based on the total mass of the reaction liquid, 0.01 mass % or more and 20.0 mass % or less, because the viscosity of the reaction liquid can be in a suitable range and the scratch resistance and the fixability of the image can be sufficiently improved. It is preferable that the polymer compound used in the reaction liquid used in the present invention is a nonionic water-soluble polymer that does not directly participate in reactions between the components, such as the pigment in the ink and the polyvalent metal ion in the reaction liquid. However, within such a range the basic performance of the reaction liquid is maintained, an anionic or cationic unit may also be included. Further, although the polymer compound may be a dispersion such as a latex or an emulsion, it is especially preferable that the polymer compound is water-soluble.

Ink

Each of the components forming the ink used in the present invention will now be described below.

Pigment

The coloring material forming the ink used in the present invention is a pigment in which a basic group that forms a cation form at the pH of the reaction liquid needs to be bonded to the surface of the pigment particle. Further, the pigment needs to be dispersed by a polymer dispersant having an acidic group that satisfies the above-described pKa condition. The content (mass %) of the pigment in the ink is preferably, based on the total mass of the ink, 0.1 mass % or more and 15.0 mass % or less, and more preferably 0.2 mass % or more and 10.0 mass % or less. The type of pigment that can be used in the present invention is not especially limited. Although any known inorganic pigment or organic pigment may be used, in the present invention it is preferable to use an inorganic pigment, and it is especially preferable to use carbon black.

Basic Group Bonded to Surface of Pigment Particle

The pigment forming the ink used in the present invention needs to have a basic group that forms a cation form at the pH of the reaction liquid and is bonded to the surface of the pigment particle. Further, the pigment needs to be dispersed by a water-soluble polymer having an acidic group that has a pKa which is equal to or more than the pH of the reaction liquid and equal to or less than the pH of the ink. Therefore, in the present invention, an action as a hydrophilic group in a self-dispersing pigment provided with a self-dispersion ability by the bonding of a hydrophilic group to the particle surface cannot be expected for the above-described basic group bonded to the surface of the pigment particle.

Examples of methods for chemically bonding the basic group that forms a cation form at the pH of the reaction liquid to the surface of the pigment particle include the following method. Specifically, a pigment having the basic group that forms a cation form at the pH of the reaction liquid is selected, or an arbitrary pigment is selected and a basic group that forms a cation form at the pH of the reaction liquid is bonded thereto by an ordinary method. In the present invention, especially, it is preferable to use a pigment having a modified particle surface that has a preferred basic group bonded to an arbitrary pigment by a method such as a diazo coupling method.

The basic group is bonded to the surface of the pigment particle directly or via another atom group. When represented in a cation form, examples of the basic group include groups having structures represented by the following formulae (1) to (4).

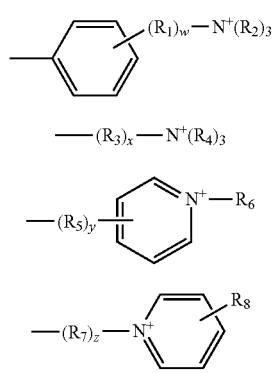

Formula (1)

Formula (2)

Formula (3)

Formula (4)

In formula (1), $R_1$ represents an alkylene group, a carbonyl group, a sulfonyl group, or a combination of two or more of these, $R_2$ each independently represents a hydrogen atom, an alkyl group, an alkylcarbonyl group, or an alkylsulfonyl group, and w is 0 or 1. Further, when w is 0, this indicates that —$N^+(R_2)_3$ is bonded to a phenyl group. In formula (2), $R_3$ represents an alkylene group, a carbonyl group, a sulfonyl group, an alkylcarbonyl group, or an alkylsulfonyl group, $R_4$ each independently represents a hydrogen atom, an alkyl group, an alkylcarbonyl group, or an alkylsulfonyl group, and x is 0 or 1. Further, when x is 0, this indicates that —$N^+(R_4)_3$ is bonded to the surface of a pigment particle. In formula (3), $R_5$ represents an alkylene group or a phenylene group, $R_6$ represents a hydrogen atom or an alkyl group, and y is 0 or 1. Further, when y is 0, this indicates that —$C_5H_4N^+R_6$ is bonded to the surface of a pigment particle. In formula (4), $R_7$ represents an alkylene group, a phenylene group, a carbonyl group, a sulfonyl group, or a combination of two or more of these, $R_8$ represents a hydrogen atom or an alkylene group, and z is 0 or 1. Further, when z is 0, this indicates that —$C_5H_4N^+R_8$ is bonded to the surface of a pigment particle. In the present invention, the number of carbon atoms on the alkyl groups, alkylene groups, alkylcarbonyl groups, and alkylsulfonyl groups is each independently 1 to 4, and preferably 1 or 2.

Specific examples of groups having the structure represented by the above formulae (1) to (4) include the following. Obviously, in the present invention, such groups are not limited to the groups represented below, as long as the group in included in the structures and definitions of the above formulae (1) to (4). In the present invention, a group having the structure represented by formula (1) described above is preferable, and among those, especially preferable is a group having a structure in which w is 0 and $R_2$ is a hydrogen atom.

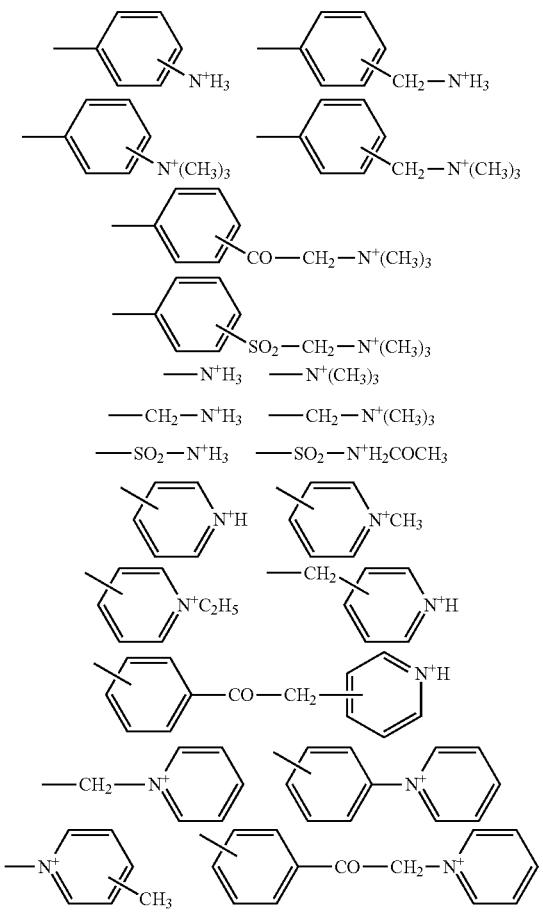

In the present invention, among basic groups, a primary amine is especially preferable. This is because primary amines make it easier for the advantageous effects of the present invention to be obtained, since the steric hindrance of the basic group moiety that forms the cation form is small, and the ionic interaction when the reaction liquid comes into contact with the ink on the recording medium is produced more easily. On the other hand, if the basic group is not a primary amine, specifically, if the basic group is a secondary, tertiary, or quaternary amine, higher-level optical density may riot be obtained.

Further, the amount of basic groups bonded to the surface of the pigment particle based on 1 g of pigment is preferably 0.01 mmol/g or more and 0.5 mmol/g or less, and more preferably 0.01 mmol/g or more and 0.1 mmol/g or less. Specifically, if this amount is less than 0.01 mmol/g, when the reaction liquid comes into contact with the ink on the recording medium, the cation amount present on the surface of the pigment particle is comparatively too low compared with the anion form polymer acidic group amount present near the surface of the pigment particle. Consequently, it is more difficult to obtain the destabilization effect of the pigment dispersed state due to ionic interaction, and thus higher-level optical density may not be obtained. On the other hand, if this amount is more than 0.5 mmol/g, the cation amount present on the surface of the pigment particle is too much, and thus it can be difficult for the pigment to be stably dispersed by the anionic polymer dispersant used in the present invention. Further, if the amount is more than 0.1 mmol/g, compared with the anion amount derived from the polymer acidic groups remaining near the surface of the pigment particle after the reaction liquid has come into contact with the ink on the recording medium, the cation amount present on the surface of the pigment particle can be comparatively high. In such a case, a phenomenon can occur in which the pigment dispersed state is conversely cationic, and thus stabilized, which makes it difficult to obtain higher-level optical density.

Further, the pigment used in the ink preferably has an average particle size (average particle size $D_{50}$ by volume) of 70 nm or more and 150 nm or less. If the average particle size is less than 70 nm, it is difficult to form large pigment aggregates when the reaction liquid comes into contact with the ink on the recording medium, and the pigment tends to permeate into the recording medium along with the aqueous medium. This can prevent optical density from being sufficiently obtained. On the other hand, if the average particle size is more than 150 nm, the pigment tends to deposit in the ink, and thus storage stability of the ink may not be sufficiently obtained.

In the present invention, the pigment with a bonded basic group need to have no acidic group having a pKa equal to or less than the pH of the reaction liquid. Examples of such an acidic group include groups having a sulfonic acid group, such as $-C_6H_4-SO_3$ and $-C_6H_4-SO_2-C_2H_4-SO_3H$.

Water-Soluble Polymer

The ink forming the set according to the present invention uses a water-soluble polymer as a polymer dispersant for dispersing the pigment in the aqueous medium. More specifically, in the ink used in the present invention, a water-soluble polymer is physically adhered or chemically bonded to the pigment, and thus the pigment is dispersed due to the water solubility of the polymer. The feature that the polymer in the present invention is water-soluble means that the polymer does not have a particle diameter when neutralized with an amount of alkali equivalent to the acid value. A polymer that satisfies such a condition is referred to in the present invention as water-soluble polymer. The content (mass %) of the water-soluble polymer in the ink is preferably, based on the total mass of the ink, 0.1 mass % or more and 5.0 mass % or less, and more preferably 0.3 mass % or more and 3.0 mass % or less.

Specific preferable examples of the water-soluble polymer included in the ink as a polymer dispersant include polymers which have at least a hydrophilic unit like that illustrated below and a hydrophobic unit as a structural unit. In the following, (meth)acylic represents acrylic and methacrylic. Examples of monomers having a hydrophilic group, which form a hydrophilic unit by polymerization, include monomers having a carboxylic group such as (meth)acrylic acid, itaconic acid, maleic acid, and fumaric acid, monomers having a phosphonic acid group such as (meth)acrylic acid-2-ethyl phosphonate, anionic monomers such as an anhydride or a salt of these acidic monomers, and monomers having a hydroxy group such as (meth)acrylic acid 2-hydroxyethyl and (meth)acrylic acid 3-hydroxylpropyl. In addition, examples of the cation forming the salt of the anionic monomer include the ions of lithium, sodium, potassium, ammonium, and organic ammonium. Examples of monomers having a hydrophobic group, which form a hydrophobic unit by polymerization, include monomers having an aromatic group such as styrene, α-methylstyrene, and benzyl(meth)acrylate, and monomers having an aliphatic group such as ethyl(meth)acrylate, methyl(meth)acrylate, (iso)propyl(meth)acrylate, (n-, iso-, t-) butyl(meth)acrylate, and 2-ethylhexyl(meth)acrylate.

Examples of a preferable water-soluble polymer as the polymer dispersant included in the ink include polymers having an acidic group in the structure that exhibits a pKa satisfying the relationship (pH of reaction liquid)<pKa<(pH of ink). Specific examples of acidic monomers having such an acidic group include (meth)acrylic acid and maleic acid. More specifically, it is preferable to use the following water-soluble polymers: a styrene-(meth)acrylic acid copolymer, a styrene-(meth)acrylic acid-alkyl(meth)acrylate ester copolymer, a styrene-maleic acid copolymer, a styrene-maleic acid-alkyl(meth)acrylate ester copolymer, a styrene-maleic acid half ester copolymer, a vinylnaphthalene-(meth)acrylate copolymer, a vinylnaphthalene-maleic acid copolymer, a styrene-maleic anhydride-maleic acid half ester copolymer, and a salt thereof.

In view of achieving high reliability as an ink, such as ejection stability and storage stability, and reactivity between the ink and reaction liquid, a preferable water-soluble polymer acid value for the polymer dispersant used in the present invention is 80 mgKOH/g or more and 300 mgKOH/g or less, and more preferable is 80 mgKOH/g or more and 160 mgKOH/g or less. If this acid value is more than 300 mgKOH/g, the hydrophobicity of the water-soluble polymer (polymer dispersant) may be too low, hydrophobic interaction with the pigment may be weak, and it can be difficult to stably disperse the pigment. On the other hand, if this acid value is less than 80 mgKOH/g, the water solubility of the water-soluble polymer is too low, and thus the dispersion treatment can take a long time to stably disperse the pigment. Further, if this acid value is more than 160 mgKOH/g, when the reaction liquid has come into contact with the ink on the recording medium, the amount of anion form polymer acidic groups remaining near the surface of the pigment particle is comparatively larger than the amount of cations present on the surface of the pigment particle. Consequently, it becomes more difficult to obtain higher-level optical density.

The content (mass %) of the water-soluble polymer in the ink is preferably 0.15 times or more and 1.00 times or less, and more preferably 0.20 times or more and 0.60 times or less, the content (mass %) of the pigment in terms of mass ratio. The content of the water-soluble polymer and the pigment in this case is a value based on the total mass of the ink. If this mass ratio is less than 0.15 times, the amount of water-soluble polymer (polymer dispersant) for covering the surface of the pigment particle to stabilize it is too low, and thus the dispersion treatment can take a long time to stably disperse the pigment. On the other hand, if this mass ratio is more than 1.00 times, a part of the water-soluble polymer (polymer dispersant) dissolves in the aqueous medium without contributing to dispersion. Consequently, the ink viscosity becomes too high, and thus the ejection stability of the ink can deteriorate. Further, if this mass ratio is less than 0.20 times, the amount of the water-soluble polymer (polymer dispersant) is too low, and thus it can become more difficult to obtain the advantage of further improving water resistance, scratch resistance, and highlighter resistance of the image, which is one of the advantageous effects of the present invention. If the mass ratio is more than 0.60 times, when the reaction liquid has come into contact with the ink on the recording medium, the amount of anion form polymer acidic groups remaining near the surface of the pigment particle is comparatively larger than the amount of cations on the surface of the pigment particle. Consequently, it can become more difficult to obtain higher-level optical density.

Aqueous Medium

It is preferable that the ink forming the set according to the present invention includes water or a mixed solvent of water and a water-soluble organic solvent as an aqueous medium. As the water, it is preferable to use deionized water or ion-exchanged water. It is preferable that the content (mass %) of the water in the ink is, based on the total mass of the ink, 50.0 mass % or more and 95.0 mass % or less. Further, as the water-soluble organic solvent, any known organic solvent generally used in ink for an ink jet may be used. Further, one kind or two kinds or more of water-soluble organic solvents may be used. Specifically, a water-soluble organic solvent selected from those described above as being usable for the reaction liquid may be used. It is preferable that the content (mass %) of the water-soluble organic solvent in the ink is, based on the total mass of the ink, 3.0 mass % or more and 50.0 mass % or less.

Other Components

In addition to the above-described components, the ink forming the set according to the present invention may optionally include an organic compound that is a solid at ordinary temperature, such as trimethylol ethane and trimethylol propane, and a nitrogen-containing compound, such as urea and ethylene urea. Further, in addition to the above-described components, the ink may optionally further include various additives, such as a surfactant, a pH regulator, a defoamer, a corrosion inhibitor, a preservative, an antifungal agent, an antioxidant, anti-reduction agent, an evaporation accelerator, and a chelating agent.

The pH of the ink is preferably 6.0 or more and 9.5 or less. If the pH of the ink is less than 6.0, the dispersion stability of the pigment can deteriorate, and thus the storage stability of the ink tends to deteriorate. If the pH of the ink is more than 9.5, the parts constituting the recording apparatus tend to corrode.

<Image Forming Method>

The image forming method according to the present invention has a step of applying an ink onto a recording medium by ejecting the ink from a recording head in an ink jet system, and a step of applying a reaction liquid onto the recording medium, in which method an image is formed by bringing the ink and the reaction liquid into contact with each other on the recording medium. Further, in this method, the above-described set of a reaction liquid and an ink according to the present invention is used. In the image forming method according to the present invention, the ink only needs to be ejected from a recording head in an ink jet system. Application of the reaction liquid may be carried out by ejecting the reaction liquid from a recording head similarly to the ink, or by coating with a roller and the like. Examples of the constitution of the apparatus for performing the image forming method according to the present invention include an ink jet recording apparatus and an ink jet recording apparatus provided with a coating mechanism. Any known constitution may be employed. Examples of the recording head mounted on the ink jet recording apparatus include heads that eject a liquid based on the action of mechanical energy or thermal energy. However, in the present invention, it is especially preferable to use a recording head that ejects a liquid based on the action of thermal energy.

The amount of the reaction liquid applied onto the recording medium may be appropriately adjusted based on the pH of the reaction liquid and the composition of the ink that will react with the reaction liquid. In the present invention, in view of uniformity of the obtained images, fixability and so on, the applied amount is preferably 0.5 g/m$^2$ or more and 10.0 g/m$^2$ or less, and more preferably more than 2 g/m$^2$ and 5.0 g/m$^2$ or less. When the region where the reaction liquid is to be applied is only a certain portion of the whole (area: m$^2$) of the recording medium, the value (g/m$^2$) of the applied amount of reaction liquid is determined based on the assumption of applying the reaction liquid over the whole surface of the recording medium, and it is preferable that this value satisfies the above range.

When applying the reaction liquid onto the recording medium by coating with a roller or the like, it is especially preferable to form the image with the ink after applying the reaction liquid, and set the viscosity of the reaction liquid to be higher than that of the ink. By having such a viscosity relationship, the ink can be effectively destabilized with a small reaction liquid applied amount, which enables image fixability and the like to be improved further. Specifically, if the viscosity of the reaction liquid is higher than the viscosity of the ink, the reaction liquid can stay more easily near the surface of the recording medium, and thus the reaction liquid tends to react more effectively with the ink. In contrast, after the ink has reacted with the reaction liquid, the pigment in the ink stay near the surface of the recording medium, and the aqueous medium and the like in the ink rapidly permeates in the depth direction of the recording medium. Specifically, since it is preferable for the ink to quickly undergo solid-liquid separation after the ink has reacted with the reaction liquid, a lower viscosity is preferable from the point of view of image fixability and the like. More specifically, the viscosity of the reaction liquid when applying the reaction liquid with a roller or the like is preferably 3 mPa·s or more and 100 mPa·s or less and more preferably 5 mPa·s or more and 60 mPa·s or less. Further, the viscosity of the ink is preferably 1 mPa·s or more and 15 mPa·s or less.

Examples of the application order when ejecting both the reaction liquid and the ink onto the recording medium from a recording head in an ink jet system include the case of applying the ink after the reaction liquid is applied, the case of applying the reaction liquid after the ink is applied, and a combination thereof. Considering the purpose of the present invention, it is preferable to at least include the case of applying the ink after the reaction liquid is first applied. Further, in view of ejection properties from the recording head in the ink jet system, the viscosity of the reaction liquid and the ink is preferably 1 mPa·s or more and 15 mPa·s or less, and more preferably 1 mPa·s or more and 5 mPa·s or less. In addition, the surface tension is preferably 25 mN/m or more and 50 mN/m or less. Moreover, it is preferable that the reaction liquid is effectively reacted with an intended ink on the recording medium. Therefore, in order that the reaction liquid does not bleed into locations other than the recording region due to the preferred ink, it is preferable to set the surface tension of the reaction liquid within the ejectable range from the recording head, and greater than surface tension of the ink which is the target of destabilization by the reaction liquid.

Examples

Next, the present invention will be described in more detail using the following examples and comparative examples. However, the present invention is not limited to the following examples, as long as it does not go beyond the gist thereof. In the below description, unless otherwise stated, "parts" and "%" are based on mass. Further, the various physical properties are values as measured at 25° C. A pH meter (F-21, manufactured by HORIBA, Ltd.) was used for measuring the pH of the reaction liquid and the ink.

<Preparation of Reaction Liquid>

The respective components illustrated in the upper section of Table 1 (units: %) were mixed, and the resultant mixture was thoroughly stirred. The mixture was then filtered under pressure with a 3.0 μm microfilter (manufactured by FUJIF-ILM Corporation) to prepare respective reaction liquids. The pH of the reaction liquids 1 to 6 was adjusted by adding a 10% solution of aqueous sulfuric acid so that the pH was that shown in the lower section of Table 1. Here, Acetylenol E100 is a nonionic surfactant manufactured by Kawaken Fine Chemical Co., Ltd.

TABLE 1

| Composition and pH of reaction liquid | | | | | | | |
|---|---|---|---|---|---|---|---|
| | Reaction liquid number | | | | | | |
| | 1 | 2 | 3 | 4 | 5 | 6 | 7 |
| Trisodium citrate | 10.0 | 10.0 | 10.0 | 10.0 | | | |
| Sodium acetate | | | | | 10.0 | | |
| Disodium glutarate | | | | | | 10.0 | |
| Calcium nitrate | | | | | | | 5.0 |
| Glycerin | 5.0 | 5.0 | 5.0 | 5.0 | 5.0 | 5.0 | 5.0 |
| 1,5-Pentanediol | 5.0 | 5.0 | 5.0 | 5.0 | 5.0 | 5.0 | 5.0 |
| Trimethylolpropane | 7.0 | 7.0 | 7.0 | 7.0 | 7.0 | 7.0 | 7.0 |

TABLE 1-continued

| Composition and pH of reaction liquid | | | | | | | |
|---|---|---|---|---|---|---|---|
| | Reaction liquid number | | | | | | |
| | 1 | 2 | 3 | 4 | 5 | 6 | 7 |
| Acetylenol E100 | 0.3 | 0.3 | 0.3 | 0.3 | 0.3 | 0.3 | 0.3 |
| Ion-exchanged water | 72.7 | 72.7 | 72.7 | 72.7 | 72.7 | 72.7 | 77.7 |
| pH | 3.5 | 4.0 | 5.0 | 5.5 | 4.0 | 4.0 | — |

<Preparation of Pigment>

(Pigments 1 to 6)

Pigments 1 to 6 were prepared in the following order. Compound 1 or 2 was dissolved in 30 g of water to form a solution. Silver nitrate was put into this solution under stirring, and the produced precipitate was removed by filtration to obtain a filtrate. $H_3N^+C_6H_4CH_2N^+H_3$ (3-aminobenzylamine) was used as compound 1 and $H_3N^+C_6H_4N^+(CH_3)_3Cl^-.I^-$ was used as compound 2. The filtrate was put under stirring into a suspension in which 10 g of carbon black having a specific surface area of 220 $m^2/g$ and a DBP oil absorption of 105 mL/100 g was dissolved in 70 g of water. Then, concentrated hydrochloric acid (an aqueous solution of 37% hydrogen chloride) was added and then a solution in which sodium nitrate was dissolved in 10 g of water was added. Once the bubbling of nitrogen gas produced by the reaction of the diazonium salt and the carbon black had finished, the pigment in the dispersion liquid was dried in a 120° C. oven, to obtain pigments 1 to 6. The upper section of Table 2 shows the usage amounts (units: g) of compounds 1 and 2, sodium nitrate, concentrated hydrochloric acid, and sodium nitrite used in the preparation of the respective pigments.

The thus-obtained pigments 1 to 5 were carbon blacks in which a —$C_6H_4CH_2N^+H_3$ group was bonded to the particle surface. Further, pigment 6 was a carbon black in which a —$C_6H_4N^+(CH_3)_3$ group was bonded to the particle surface.

Pigment 7

A carbon black having a specific surface area of 220 $m^2/g$ and a DBP oil absorption of 105 mL/100 g was used as pigment 7.

The amount of basic groups per g of the pigment was determined by quantifying the amount of counterions in pigments 1 to 7 using an ion chromatograph (DX320; manufactured by DIONEX). The results are shown in the lower section of Table 2. Further, the lower section of Table 2 also shows the structures of the basic groups in each pigment.

TABLE 2

| Pigment preparation conditions and properties | | | | | | | | |
|---|---|---|---|---|---|---|---|---|
| | | Pigment type | | | | | | |
| | | 1 | 2 | 3 | 4 | 5 | 6 | 7 |
| Components used in pigment preparation | Compound 1 | 0.78 | 0.26 | 0.13 | 0.026 | 0.013 | | — |
| | Compound 2 | | | | | | 0.31 | — |
| | Silver nitrate | 1.0 | 0.34 | 0.17 | 0.034 | 0.017 | 0.17 | — |
| | Concentrated hydrochloric acid | 1.35 | 0.46 | 0.23 | 0.046 | 0.023 | 0.23 | — |
| | Sodium nitrite | 0.5 | 0.17 | 0.083 | 0.017 | 0.0083 | 0.083 | — |
| Pigment properties | Amount of basic groups per g of pigment [mmol/g] | 0.3 | 0.1 | 0.05 | 0.01 | 0.005 | 0.05 | 0.0 |
| | Basic group structure | Primary amine | Primary amine | Primary amine | Primary amine | Primary amine | Quaternary amine | — |

<Preparation of Water-Soluble Polymer>

The respective monomers of the compositions (mass ratio) illustrated in the upper section of Table 3 were polymerized by an ordinary method to obtain polymers 1 to 9 having a weight average molecular weight of 8,000. The pKa and the acid value of the obtained polymers were measured using a potentiometric titrator (automatic potentiometric titrator AT-510, manufactured by Kyoto Electronics Manufacturing Co., Ltd.). The results are shown in the lower part of Table 3. When the polymers 1 to 9 were neutralized with an amount of alkali equivalent to the acid value, these polymers did not have a particle diameter, and were water soluble.

TABLE 3

Composition and properties of water-soluble polymers

| | | Water-soluble polymer type | | | | | | | | |
|---|---|---|---|---|---|---|---|---|---|---|
| | | 1 | 2 | 3 | 4 | 5 | 6 | 7 | 8 | 9 |
| Monomer composition | Styrene | 82 | 91 | 90 | 80 | 78 | 48 | 70 | 74 | 77 |
| | Acrylic acid | 18 | 9 | 10 | 20 | 22 | | | 13 | 10 |
| | Acrylamide-t-butyl sulfonic acid | | | | | | 52 | | 13 | |
| | p-vinyl phenol | | | | | | | 30 | | 13 |
| Properties | pKa | 5.0 | 5.0 | 5.0 | 5.0 | 5.0 | 1.5 | 10.0 | 1.5 / 5.0 | 5.0 / 10.0 |
| | Acid value [mgKOH/g] | 140 | 70 | 80 | 160 | 170 | 140 | 140 | 140 | 140 |

<Preparation of Pigment Dispersion>

(Pigment Dispersions 1 to 19)

A water-soluble polymer of the type and in the usage amount (solid content) shown in the upper section of Table 4 was dissolved in ion-exchanged water using 1 neutralization equivalent of potassium hydroxide. A pigment and ion-exchanged water were then mixed into the solution in the usage amounts shown in the upper section of Table 4, and the resultant mixture was dispersed for 3 hours using a batch-type vertical sand mill. The obtained dispersion liquid was subjected to centrifugal separation to remove coarse particles. Subsequently, the dispersion liquid was subjected to pressure filtration by a microfilter (manufactured by FUJIFILM Corporation) having a pore size of 3.0 μm. Ion-exchanged water was added to adjust the content of the pigment and the water-soluble polymer to the values shown in the lower section of Table 4, thereby preparing the respective pigment dispersions. However, for pigment dispersions 8, 13, and 15, dispersion for 3 hours was insufficient, and additional dispersion for 12 hours was required.

TABLE 4

Composition (Units: %) of Pigment dispersion

| | Pigment dispersion number | | | | | | | | | |
|---|---|---|---|---|---|---|---|---|---|---|
| | 1 | 2 | 3 | 4 | 5 | 6 | 7 | 8 | 9 | 10 |
| Pigment 1 | 10.0 | | | | | | | | | |
| Pigment 2 | | 10.0 | | | | | | | | |
| Pigment 3 | | | 10.0 | 10.0 | 10.0 | 10.0 | 10.0 | 10.0 | 10.0 | 10.0 |
| Pigment 4 | | | | | | | | | | |
| Pigment 5 | | | | | | | | | | |
| Pigment 6 | | | | | | | | | | |
| Pigment 7 | | | | | | | | | | |
| Polymer 1 | 3.0 | 3.0 | 1.5 | 2.0 | 3.0 | 6.0 | 8.0 | | | |
| Polymer 2 | | | | | | | | 3.0 | | |
| Polymer 3 | | | | | | | | | 3.0 | |
| Polymer 4 | | | | | | | | | | 3.0 |
| Polymer 5 | | | | | | | | | | |
| Polymer 6 | | | | | | | | | | |
| Polymer 7 | | | | | | | | | | |
| Polymer 8 | | | | | | | | | | |
| Polymer 9 | | | | | | | | | | |
| Ion-exchanged water | 87.0 | 87.0 | 88.5 | 88.0 | 87.0 | 84.0 | 82.0 | 87.0 | 87.0 | 87.0 |
| Pigment content | 8.0 | 8.0 | 8.0 | 8.0 | 8.0 | 8.0 | 8.0 | 8.0 | 8.0 | 8.0 |
| Water-soluble polymer content | 2.4 | 2.4 | 1.2 | 1.6 | 2.4 | 4.8 | 6.4 | 2.4 | 2.4 | 2.4 |

TABLE 4-continued

Composition (Units: %) of Pigment dispersion

| | Pigment dispersion number | | | | | | | | |
|---|---|---|---|---|---|---|---|---|---|
| | 11 | 12 | 13 | 14 | 15 | 16 | 17 | 18 | 19 |
| Pigment 1 | | | | | | | | | |
| Pigment 2 | | | | | | | | | |
| Pigment 3 | 10.0 | 10.0 | 10.0 | 10.0 | 10.0 | | | | |
| Pigment 4 | | | | | | 10.0 | | | |
| Pigment 5 | | | | | | | 10.0 | | |
| Pigment 6 | | | | | | | | 10.0 | |
| Pigment 7 | | | | | | | | | 10.0 |
| Polymer 1 | | | | | | 3.0 | 3.0 | 3.0 | 3.0 |
| Polymer 2 | | | | | | | | | |
| Polymer 3 | | | | | | | | | |
| Polymer 4 | | | | | | | | | |
| Polymer 5 | 3.0 | | | | | | | | |
| Polymer 6 | | 3.0 | | | | | | | |
| Polymer 7 | | | 3.0 | | | | | | |
| Polymer 8 | | | | 3.0 | | | | | |
| Polymer 9 | | | | | 3.0 | | | | |
| Ion-exchanged water | 87.0 | 87.0 | 87.0 | 87.0 | 87.0 | 87.0 | 87.0 | 87.0 | 87.0 |
| Pigment content | 8.0 | 8.0 | 8.0 | 8.0 | 8.0 | 8.0 | 8.0 | 8.0 | 8.0 |
| Water-soluble polymer content | 2.4 | 2.4 | 2.4 | 2.4 | 2.4 | 2.4 | 2.4 | 2.4 | 2.4 |

(Pigment Dispersion 20)

Further, pigment dispersion 20 was prepared based on the following method. 500 g of carbon black (pigment) having a specific surface area of 220 m²/g and a DBP oil absorption of 112 mL/100 g, 45 g of aminophenyl-2-sulfate ethyl-sulfone (APSES), and 900 g of distilled water were put into a reaction vessel, and the resultant mixture was stirred at 55° C. for 20 minutes at a rotation speed of 300 rpm. To the mixture, 40 g of a 25% solution of aqueous sodium nitrite was added over 15 minutes followed by addition of 50 g of distilled water. The mixture was then reacted for 2 hours at 60° C. The reaction product was removed while diluting with distilled water, so that the solid content of the product was adjusted to 15.0%. Subsequently, impurities were removed by centrifugal separation to obtain a dispersion liquid A. This dispersion liquid A included a pigment having the APSES bonded thereto.

Next, the following operation was carried out to determine the moles of the group bonded to the pigment in the dispersion liquid A. Using a sodium ion electrode (1512A-10C; manufactured by HORIBA, Ltd.), the sodium ion concentration in the dispersion liquid was measured, and converted into the moles to the pigment solid content. Then, at room temperature, the dispersion liquid A, which has a solid content of 15.0%, was added dropwise into a pentaethylene hexamine (PEHA) solution over 1 hour while strongly stirring. The PEHA concentration in the PEHA solution at this stage was set to 1 to 10 times the moles of sodium ions measured above, and the solution amount was set to be the same amount as the dispersion liquid A. The resultant mixture was stirred for 18 to 48 hours, after which impurities were removed to obtain a dispersion liquid B. This dispersion liquid B included a pigment having the PEHA bonded to the particle surface via the APSES, and had a solid content of 10.0%.

500 g of the thus-obtained dispersion liquid B, which has a solid content of 10.0%, was added dropwise while stirring into a solution in which a styrene-acrylic acid copolymer (weight average molecular weight: 15,000, acid value: 140 mgKOH/g, dispersity Mw/Mn: 1.5), which is a water-soluble polymer, was dissolved. The aqueous solution used in this step was prepared by adding 1,800 g of distilled water into 190 g of the above-described styrene-acrylic acid copolymer, adding the required amount of sodium hydroxide to neutralize the polymer, and dissolving the resultant mixture by stirring. The mixture was transferred to a Pyrex® evaporating pan and heated for 15 hours at 150° C. to evaporate the liquid components. The dry product was then cooled to room temperature. Next, the dry product was put into distilled water having a pH adjusted to 9.0 with sodium hydroxide, and the resultant mixture was dispersed using a disperser. Under stirring, an aqueous solution of 1.0 mol/L sodium hydroxide was further added to adjust the pH of the solution to 10 to 11. Subsequently, desalting was carried out, and impurities and coarse particles were removed, whereby the pigment dispersion 20 was obtained. The content of the pigment component in the pigment dispersion 20 was 8.0% and the content of the polymer component was 3.0%.

<Preparation of Ink>

The respective components (units: %) shown in the upper section of Table 5 were mixed, and the resultant mixture was thoroughly stirred. The mixture was then subjected to pressure filtration by a microfilter (manufactured by FUJIFILM Corporation) having a pore size of 1.0 μm to prepare the respective inks. The pH of inks 1 to 21 was adjusted to that shown in the lower section of Table 5 by adding an aqueous solution of 10% potassium hydroxide or an aqueous solution of 10% sulfuric acid. Here, Acetylenol E100 is a nonionic surfactant manufactured by Kawaken Fine Chemical Co., Ltd. For ink 13, an aggregate was produced when the aqueous solution of 10% sulfuric acid was added, and thus an ink could not be obtained. The average particle size $D_{50}$ of the pigments in inks 1 to 12 and 14 to 21 was measured using a dynamic light-scattering particle size/particle distribution analyzer (Nanotrac UPA-EX150, manufactured by Nikkiso Co., Ltd.). The results showed that all of these inks had an average particle size $C_{50}$ of about 100 nm. The lower section of Table 5 shows the water-soluble polymer content, the pigment content, and the mass ratio of the water-soluble polymer based on the pigment content in each of the inks.

TABLE 5

| Composition and properties of Ink | | | | | | | | | | | |
|---|---|---|---|---|---|---|---|---|---|---|---|
| | Ink number | | | | | | | | | | |
| | 1 | 2 | 3 | 4 | 5 | 6 | 7 | 8 | 9 | 10 | 11 |
| Pigment dispersion 1 | 50.0 | | | | | | | | | | |
| Pigment dispersion 2 | | 50.0 | | | | | | | | | |
| Pigment dispersion 3 | | | 50.0 | | | | | | | | |
| Pigment dispersion 4 | | | | 50.0 | | | | | | | |
| Pigment dispersion 5 | | | | | 50.0 | | | | | | |
| Pigment dispersion 6 | | | | | | 50.0 | | | | | |
| Pigment dispersion 7 | | | | | | | 50.0 | | | | |
| Pigment dispersion 8 | | | | | | | | 50.0 | | | |
| Pigment dispersion 9 | | | | | | | | | 50.0 | | |
| Pigment dispersion 10 | | | | | | | | | | 50.0 | |
| Pigment dispersion 11 | | | | | | | | | | | 50.0 |
| Pigment dispersion 12 | | | | | | | | | | | |
| Pigment dispersion 13 | | | | | | | | | | | |
| Pigment dispersion 14 | | | | | | | | | | | |
| Pigment dispersion 15 | | | | | | | | | | | |
| Pigment dispersion 16 | | | | | | | | | | | |
| Pigment dispersion 17 | | | | | | | | | | | |
| Pigment dispersion 18 | | | | | | | | | | | |
| Pigment dispersion 19 | | | | | | | | | | | |
| Pigment dispersion 20 | | | | | | | | | | | |
| Glycerin | 5.0 | 5.0 | 5.0 | 5.0 | 5.0 | 5.0 | 5.0 | 5.0 | 5.0 | 5.0 | 5.0 |
| Ethylene urea | 10.0 | 10.0 | 10.0 | 10.0 | 10.0 | 10.0 | 10.0 | 10.0 | 10.0 | 10.0 | 10.0 |
| 1,5-Pentanediol | | | | | | | | | | | |
| Trimethylolpropane | | | | | | | | | | | |
| Acetylenol E100 | 1.0 | 1.0 | 1.0 | 1.0 | 1.0 | 1.0 | 1.0 | 1.0 | 1.0 | 1.0 | 1.0 |
| Ion-exchanged water | 34.0 | 34.0 | 34.0 | 34.0 | 34.0 | 34.0 | 34.0 | 34.0 | 34.0 | 34.0 | 34.0 |
| pH | 9.0 | 9.0 | 9.0 | 9.0 | 9.0 | 9.0 | 9.0 | 9.0 | 9.0 | 9.0 | 9.0 |
| Water-soluble polymer content [%] | 1.2 | 1.2 | 0.6 | 0.8 | 1.2 | 2.4 | 3.2 | 1.2 | 1.2 | 1.2 | 1.2 |
| Pigment content [%] | 4.0 | 4.0 | 4.0 | 4.0 | 4.0 | 4.0 | 4.0 | 4.0 | 4.0 | 4.0 | 4.0 |
| Water-soluble polymer/pigment [times] | 0.30 | 0.30 | 0.15 | 0.20 | 0.30 | 0.60 | 0.80 | 0.30 | 0.30 | 0.30 | 0.30 |

| | Ink number | | | | | | | | | |
|---|---|---|---|---|---|---|---|---|---|---|
| | 12 | 13 | 14 | 15 | 16 | 17 | 18 | 19 | 20 | 21 |
| Pigment dispersion 1 | | | | | | | | | | |
| Pigment dispersion 2 | | | | | | | | | | |
| Pigment dispersion 3 | | | | | | | | | | |
| Pigment dispersion 4 | | | | | | | | | | |
| Pigment dispersion 5 | | | | | | | | | | |
| Pigment dispersion 6 | | | | | | | | | | |
| Pigment dispersion 7 | | | | | | | | | | |
| Pigment dispersion 8 | | | | | | | | | | |
| Pigment dispersion 9 | | | | | | | | | | |
| Pigment dispersion 10 | | | | | | | | | | |
| Pigment dispersion 11 | | | | | | | | | | |
| Pigment dispersion 12 | 50.0 | | | | | | | | | |
| Pigment dispersion 13 | | 50.0 | | | | | | | 50.0 | |
| Pigment dispersion 14 | | | 50.0 | | | | | | | |
| Pigment dispersion 15 | | | | 50.0 | | | | | | |
| Pigment dispersion 16 | | | | | 50.0 | | | | | |
| Pigment dispersion 17 | | | | | | 50.0 | | | | |
| Pigment dispersion 18 | | | | | | | 50.0 | | | |
| Pigment dispersion 19 | | | | | | | | 50.0 | | |
| Pigment dispersion 20 | | | | | | | | | | 50.0 |
| Glycerin | 5.0 | 5.0 | 5.0 | 5.0 | 5.0 | 5.0 | 5.0 | 5.0 | 5.0 | 5.0 |
| Ethylene urea | 10.0 | 10.0 | 10.0 | 10.0 | 10.0 | 10.0 | 10.0 | 10.0 | 10.0 | |
| 1,5-Pentanediol | | | | | | | | | | 6.0 |
| Trimethylolpropane | | | | | | | | | | 5.0 |
| Acetylenol E100 | 1.0 | 1.0 | 1.0 | 1.0 | 1.0 | 1.0 | 1.0 | 1.0 | 1.0 | 0.1 |
| Ion-exchanged water | 34.0 | 34.0 | 34.0 | 34.0 | 34.0 | 34.0 | 34.0 | 34.0 | 34.0 | 33.9 |
| pH | 9.0 | 9.0 | 9.0 | 9.0 | 9.0 | 9.0 | 9.0 | 9.0 | 10.0 | 9.0 |
| Water-soluble polymer content [%] | 1.2 | 1.2 | 1.2 | 1.2 | 1.2 | 1.2 | 1.2 | 1.2 | 1.2 | 1.5 |
| Pigment content [%] | 4.0 | 4.0 | 4.0 | 4.0 | 4.0 | 4.0 | 4.0 | 4.0 | 4.0 | 4.0 |
| Water-soluble polymer/pigment [times] | 0.30 | 0.30 | 0.30 | 0.30 | 0.30 | 0.30 | 0.30 | 0.30 | 0.30 | 0.38 |

<Evaluation>

The thus-obtained inks and reaction liquids were used to form sets of a reaction liquid and an ink in the combinations shown on the left side of Table 6. The respective sets of Examples 1 to 22 and Comparative Examples 1 to 4 had a difference between the pH of the reaction liquid and the pH of a mixture formed by mixing equal amounts of the ink and the reaction liquid of within 0.1, and thus the reaction liquid had a buffering action against pH change.

Evaluation was carried out under the following conditions using these sets. A modified ink jet recording apparatus (trade name, BJ-F900; manufactured by Canon Inc.) mounted with a recording head which ejects a liquid based on a thermal energy effect was used for image formation. The ink and the reaction liquid forming the set were each set in a cartridge. The ink cartridge was set in the yellow position, and the reaction liquid cartridge was set in the black position. The recording was performed under conditions of a 1 pass one-way recording, in which an image having the arrangement width of the ejection orifices of the recording head was recorded only by scans that started from the home position of the recording head, so that the reaction liquid and the ink overlapped on the recording medium. Further, with 1/600 inch× 1/600 inch defined as a pixel, the amount of reaction liquid applied on the recording medium was 8 ng per pixel, and the amount of ink applied on the recording medium was 16 ng per pixel. The images used for each evaluation were formed on three kinds of recording medium, PB PAPER GF-500, Canon Extra (both manufactured by Canon Inc.), and PPC paper, BUSINESS MULTIPURPOSE 4200 PAPER (manufactured by Xerox). In the present invention, based on the evaluation criteria for the following evaluation items, B or higher was determined to be acceptable, and C was determined to be unacceptable. The evaluation results are shown on the right side of Table 6.

Evaluation of Optical Density

Using the sets shown in Table 6, 5 cm×5 cm solid images were formed on each of the three kinds of recording mediums. One day later, the optical density of the solid images was measured using a spectrophotometer (trade name: Spectrolino; manufactured by Gretag Macbeth) under conditions of a light source: D50 and field: 2°. Evaluation was carried out based on the average value and minimum value of the three recording media. The evaluation criteria of optical density are as follows.

A: Average value of optical density of 1.5 or more, and minimum value of 1.4 or more.
B: Average value of optical density of 1.5 or more, and minimum value of 1.3 or more and less than 1.4.
C: Average value of optical density of less than 1.5.

Evaluation of Highlighter Resistance

Using the sets shown in Table 6, a character was recorded on each of the three kinds of recording medium. One day later, the character portion was highlighted with a Fluorescent Optics 2 Yellow (highlighter pen manufactured by Zebra Co., Ltd.). Highlighter resistance was evaluated based on visual confirmation of the character portion. The evaluation criteria of highlighter resistance are as follows. When an image is highlighted with a highlighter pen, the image is rubbed in a state in which the pen includes moisture. Therefore, if the highlighter resistance is an A or B rank, this means that the image has water resistance and scratch resistance.
A: No trail in any of the three kinds of the recording medium.
B: Trail in one or two kinds of the recording medium.
C: Trail in all three kinds of the recording medium.

TABLE 6

Composition of set and evaluation results

| | Composition of set | | | | Evaluation results | |
|---|---|---|---|---|---|---|
| | Ink | | Reaction liquid | | Optical | Highlighter |
| | Number | pH | Number | pH | density | resistance |
| Example 1 | 1 | 9.0 | 2 | 4.0 | B | A |
| Example 2 | 2 | 9.0 | 2 | 4.0 | A | A |
| Example 3 | 3 | 9.0 | 2 | 4.0 | A | B |
| Example 4 | 4 | 9.0 | 2 | 4.0 | A | A |
| Example 5 | 5 | 9.0 | 2 | 4.0 | A | A |
| Example 6 | 6 | 9.0 | 2 | 4.0 | A | A |
| Example 7 | 7 | 9.0 | 2 | 4.0 | B | A |
| Example 8 | 8 | 9.0 | 2 | 4.0 | A | A |
| Example 9 | 9 | 9.0 | 2 | 4.0 | A | A |
| Example 10 | 10 | 9.0 | 2 | 4.0 | A | A |
| Example 11 | 11 | 9.0 | 2 | 4.0 | B | A |
| Example 12 | 14 | 9.0 | 2 | 4.0 | B | A |
| Example 13 | 15 | 9.0 | 2 | 4.0 | A | A |
| Example 14 | 16 | 9.0 | 2 | 4.0 | A | A |
| Example 15 | 17 | 9.0 | 2 | 4.0 | B | A |
| Example 16 | 18 | 9.0 | 2 | 4.0 | B | A |
| Example 17 | 20 | 10.0 | 2 | 4.0 | A | A |
| Example 18 | 5 | 9.0 | 1 | 3.5 | A | A |
| Example 19 | 5 | 9.0 | 3 | 5.0 | A | A |
| Example 20 | 20 | 10.0 | 4 | 5.5 | A | A |
| Example 21 | 5 | 9.0 | 5 | 4.0 | A | A |
| Example 22 | 5 | 9.0 | 6 | 4.0 | A | A |
| Comparative Example 1 | 12 | 9.0 | 2 | 4.0 | C | C |
| Comparative Example 2 | 19 | 9.0 | 2 | 4.0 | C | A |
| Comparative Example 3 | 21 | 9.0 | 2 | 4.0 | C | B |
| Comparative Example 4 | 5 | 9.0 | 4 | 5.5 | C | C |
| Comparative Example 5 | 5 | 9.0 | 7 | — | B | C |

In Examples 17 and 20, the pH of the used ink 20 was 10.0, which is high. Consequently, when performing a recording durability test, a phenomenon was observed in which ink was not ejected as the number of recording sheets increased. Further, for Example 8, which used ink 8 having a polymer dispersant acid value of less than 80 mgKOH/g, and for Example 13, which used ink 15 in which the polymer dispersant has an acidic group with a pKa higher than the pH of the ink for some of the hydrophilic groups, there was an increased number of particles having an average particle size of 500 nm or more. More specifically, when inks 8 and 15 were stored at 60° C. for 3 months and then the number of coarse particles in the pigment was measured with a number counting type particle size distribution meter (Accusizer; manufactured by Particle Sizing Systems), the number of particles having a size of 500 nm or more increased. Further, when the same evaluations as above were attempted using reaction liquids having a pH of 3.0 and 6.0, for the reaction liquid with a pH of 6.0, acid corrosion occurred on some of the parts constituting the recording apparatus, while for the reaction liquid with a pH of 3.0, the reaction liquid did not react with the ink and the evaluation result of the optical density was C.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-282060, filed Dec. 11, 2009, which is hereby incorporated by reference herein in its entirety.

What is claimed is:

1. A set of a reaction liquid that has a buffering action against pH change and exhibits a pH of 3.5 or more and 5.5 or less, and an ink that has a higher pH than the reaction liquid,
   wherein the ink comprises a pigment, wherein a basic group that forms a cation form at the pH of the reaction liquid is bonded to the surface of the pigment,
   wherein an amount of basic groups bonded to the surface of the pigment based on 1 g of pigment is 0.01 mmol/g or more and 0.1 mmol/g or less,
   wherein the pigment does not have an acidic group having a pKa equal to or less than the pH of the reaction liquid, and
   wherein the pigment is dispersed by a water-soluble polymer that has an acidic group having a pKa equal to or more than the pH of the reaction liquid and equal to or less than the pH of the ink.

2. The set of a reaction liquid and an ink according to claim 1, wherein for all hydrophilic groups that the water-soluble polymer has, each is an acidic group having a pKa that is equal to or more than the pH of the reaction liquid and equal to or less than the pH of the ink.

3. The set of a reaction liquid and an ink according to claim 1, wherein the acidic group of the water-soluble polymer is a carboxyl group.

4. The set of a reaction liquid and an ink according to claim 1, wherein a content (mass %) of the water-soluble polymer in the ink is 0.20 times or more and 0.60 times or less a content (mass %) of the pigment in terms of mass ratio.

5. The set of a reaction liquid and an ink according to claim 1, wherein the water-soluble polymer has an acid value of 80 mgKOH/g or more and 160 mgKOH/g or less.

6. The set of a reaction liquid and an ink according to claim 1, wherein the basic group is a primary amine.

7. An image forming method comprising:
   applying an ink onto a recording medium by ejecting the ink from a recording head of an ink jet system and applying a reaction liquid onto the recording medium, in which method an image is formed by bringing the ink and the reaction liquid into contact with each other on the recording medium,
   wherein the set of a reaction liquid and an ink according to claim 1 is used for the reaction liquid and the ink.

* * * * *